(12) United States Patent
Makiura et al.

(10) Patent No.: US 6,285,520 B1
(45) Date of Patent: Sep. 4, 2001

(54) MAGNETIC DISK DEVICE AND AUTOMATIC ADAPTATION METHOD OF ITS PARAMETER

(75) Inventors: Tetsuya Makiura, Odawara; Reijiro Tsuchiya, Fujisawa, both of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/317,609

(22) Filed: May 25, 1999

(30) Foreign Application Priority Data

May 26, 1998 (JP) .................................................. 10-143760

(51) Int. Cl.[7] .................................................. G11B 5/035
(52) U.S. Cl. .................................................. 360/65; 360/46
(58) Field of Search ........................ 360/46, 65; 375/232

(56) References Cited

U.S. PATENT DOCUMENTS 5,638,225 * 6/1997 Tsuboi et al. ........................... 360/27
5,886,844 * 3/1999 Shimizu .................................. 360/65

FOREIGN PATENT DOCUMENTS 8-293165  11/1996  (JP) .

* cited by examiner

Primary Examiner—Regina Y. Neal
(74) Attorney, Agent, or Firm—Mattingly, Stanger & Malur, P.C.

(57) ABSTRACT

In a magnetic disk device, a deterioration of performance caused by an environmental variation is suppressed by utilizing an automatic adaptation function in a read/write channel IC. A gate provides a timing for the automatic adaptation of an equalization coefficient, a signal from the gate is given to a read-gate input terminal of the read/write channel IC, and the gate for the automatic adaptation is opened before reading data from a destination sector to be read. The automatic adaptation is started, whereby coefficients for equalization are adapted to signal wave forms before reading data.

3 Claims, 3 Drawing Sheets

MAGNETIC DISK DEVICE AND AUTOMATIC ADAPTATION METHOD OF ITS PARAMETER

FIELD OF THE INVENTION

The present invention is related to a magnetic disk device, especially, a recording technology which provides an automatic adaptation function of a parameter against a variation of the environment around the magnetic disk device, and which gives highly reliable magnetic recording.

BACKGROUND OF THE INVENTION

Today, with advancement of the information-oriented society, an amount of information being processed by computers has increased. Correspondingly it is strongly required to increase the storage capacity of a magnetic disk device, and a successive improvement of recording density is indispensable.

To increase the recording density of a magnetic disk device, it is important to improve a performance of a read/write channel along with an improving performance of components such as a magnetic head and a magnetic disk medium. Especially, in recent years, the PRML method has been employed in the reproducing channel and performance of discriminating data from a low S/N reproduced signal has been improved. In this PRML method, interference between the front part and rear part of a reproduced signal is used effectively, therefore it is necessary to equalize the reproduced signal wave to an ideal wave form and obtain proper interference of the wave form. When an equalization error is considerable, a discrimination error occurs easily and reproduction of recorded data may not be executed normally. Therefore, the wave equalization technology is especially important. Further, this wave equalization technology is important also in an improved PRML method.

Accordingly, when a variation of the reproduced signal wave form is caused by a variation in characteristics of a magnetic head or magnetic disk medium, etc., the adaptive equalization technology is combined in order to equalize the reproduced signal wave form to the ideal wave form.

In the usual adaptive equalization as shown in FIG. 1, an equalization error at each sampling point on the reproduced signal wave form is evaluated, and a value of equalization coefficient at each tap of a transversal equalizer is learned and applied so as to minimize the equalization error. Further, in order to absorb a deviation of synchronization timing in a read operation caused by a variation of the read/write channel IC, various kinds of methods for automatic adaptation functions of parameters have also been applied. These technologies recently have advanced and have been applied rapidly to a wide range of digital technology fields.

A technology in that parameters are automatically adjusted with a constant time interval specified in advance instead of at each read operation, is disclosed in Japanese patent unexamined publication Hei 8-293165 (patent application Hei 7-96820).

This automatic adaptation of coefficient for equalization is started at the same time that reproducing data is started as shown in FIG. 2. Namely, automatic adaptation of the equalization coefficient is executed using a signal wave received in a read-gate timing. Therefore, when the device has just started, or when some long time has passed after the previous adaptation, coefficients for equalization are not fully adapted or adapted insufficiently.

When the equalization coefficients before being adapted have inadequate values, there is a possibility of making some troubles such that a long time is required for adaptation or the read operation is abortive at the beginning of reading data. Therefore, it is required that the equalization coefficients are to be set to the adequate initial constants at the beginning of automatic adaptation. The initial constants are learned at a shipment of the device and are recorded on the management information area in which the initial values of various parameters on the disk device are stored.

Coefficients for equalization are varied corresponding to a variation of characteristics of magnetic heads and magnetic disk media, and the initial constants are to be set for each head. Furthermore, recently, the magnetic disk has a constitution in which the disk medium is divided into plural zones radially and recording densities are optimized for each zone. Therefore, the initial constants are required to be set for each zone.

The above-mentioned initial constants are applied as equalization coefficients to a signal processing circuit that processes first read-out data just after the device has been started, after a head has been switched to another, or after a zone has been changed.

In conventional technologies as described above, in order to keep parameters such as coefficients for equalization as adequate as possible, the parameters learned at the shipment of the device are applied to. However, when an environment in real use differs seriously from one environment at the initial learning to another, the reproduced wave form is more varied from the original one, the equalization error becomes large, and the read error occurs easily at the data-read operation. This phenomenon makes the magnetic disk device seem to be deteriorated in performance. However, even in this environment, if the coefficient for equalization is learned again, it is often possible to read the data normally. As described above, the purpose of the present invention is to provide a magnetic disk device in which a deterioration of performance caused by environmental variation is suppressed to the utmost.

SUMMARY OF THE INVENTION

To solve the problem described above, in a magnetic disk device which contains a read/write channel IC having the usual automatic adaptation function of a parameter, a means to produce a gate signal for an automatic adaptation timing (gate signal 2 for the automatic adaptation in FIG. 3) and a logical-OR means (logical OR gate) having as inputs said gate signal 2 and read gate signal 1, are added in the logical circuit, and an output from said OR gate (logical OR gate signal 3) is given to a read gate input terminal of said read/write channel IC.

An example of each gate timing in the adaptation of the coefficient for equalization at data reading is shown in FIG. 3. In the configuration described above, the gate which produces the timing for the automatic adaptation of the coefficient for equalization is provided, the gate for the automatic adaptation is opened toward the read command issued for data reading after seek has been completed and before data in the destination sector will be read, and the automatic adaptation is started. Hereby, the coefficients for equalization are adapted for a reproduced signal wave form as proper as possible till a beginning of data reading. As a result, adequate coefficients for equalization can be obtained during the data-reading operation.

DESCRIPTION OF THE PREFERRED EMBODIMENTS

Figure 4:
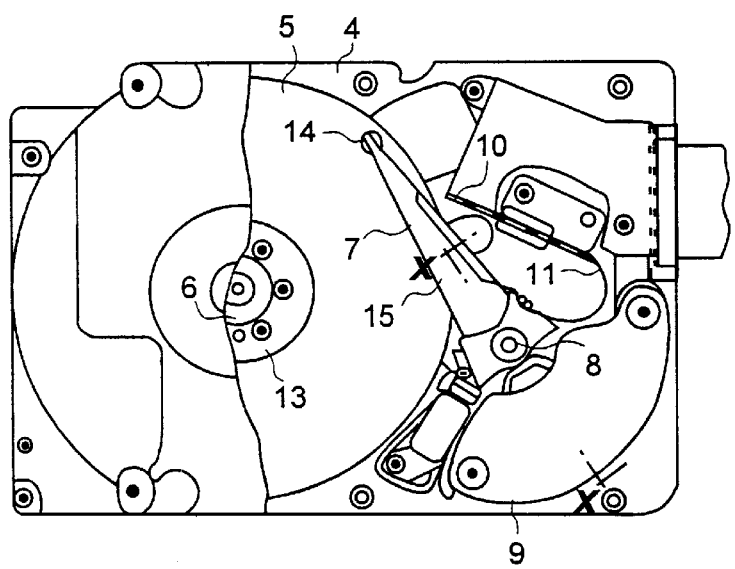
FIG. 4 is a plane view diagram of a magnetic disk device to which the present invention is applied.
Figure 5:
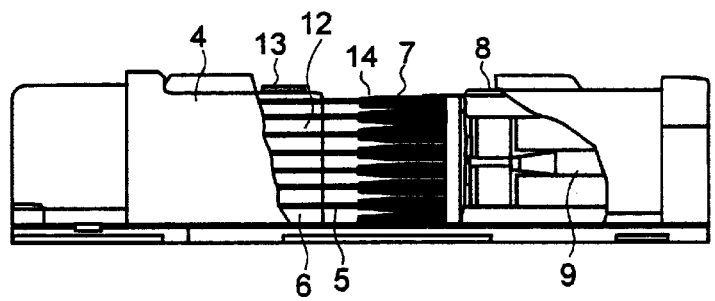
FIG. 5 is a side view diagram of the magnetic disk device shown in FIG. 4.

A magnetic disk device to which the present invention is applied is explained referring to FIG. 4 and FIG. 5.

A magnetic disk device comprises a sealed enclosure 4, disks 5 which are rotating magnetic media, a spindle motor 6 which supports and rotates the disk 5, a head assembly 7 having suspension arms and magnetic heads which read out data from the disk 5, a swing arm (suspension arm 15) containing a pivot shaft 8 which supports the head assembly 7 and moves it on the disk, a voice coil motor 9 which drives the swing arm, an electronic circuit 10 which lets the magnetic head write data to the disk 5 and read data from the disk 5, and a printed circuit board 11 which connects electrically to a controller to control operation of the spindle motor 6 and the voice coil motor 9. The disk 5, the spindle motor 6, the head assembly 7, the voice coil motor 9, and the printed circuit board 11 exist inside the enclosure 4 and are sealed within the enclosure 4.

The spindle motor 6 comprising a hub which fixes the disk 5 at its outer-circumference, a rotor and a stator which are built in the hub (an in-hub type motor), is built on a base plate of the enclosure 4. However, in the embodiment of the present invention, the spindle motor is not limited to the in-hub type motor.

The disk 5 is an important component which determines the data storage capacity of the magnetic disk device. For example, the device comprises one or several disks corresponding to storage capacity. In this magnetic disk device, the disk 5 and a disk spacer 12 (FIG. 5) are inserted alternately on the hub. A disk clamp 13 fixes the disk 5 on the spindle motor 6 by clamping a pile of disks in the axial direction of the spindle motor 6.

There are several swing arms corresponding to the number of disks, which comprise plural sliders 14 carrying magnetic heads, and plural suspension arms 15 (FIG. 4). The swing arms are fixed to the base plate through the pivot shaft 8 so as to rotate freely.

Figure 6:
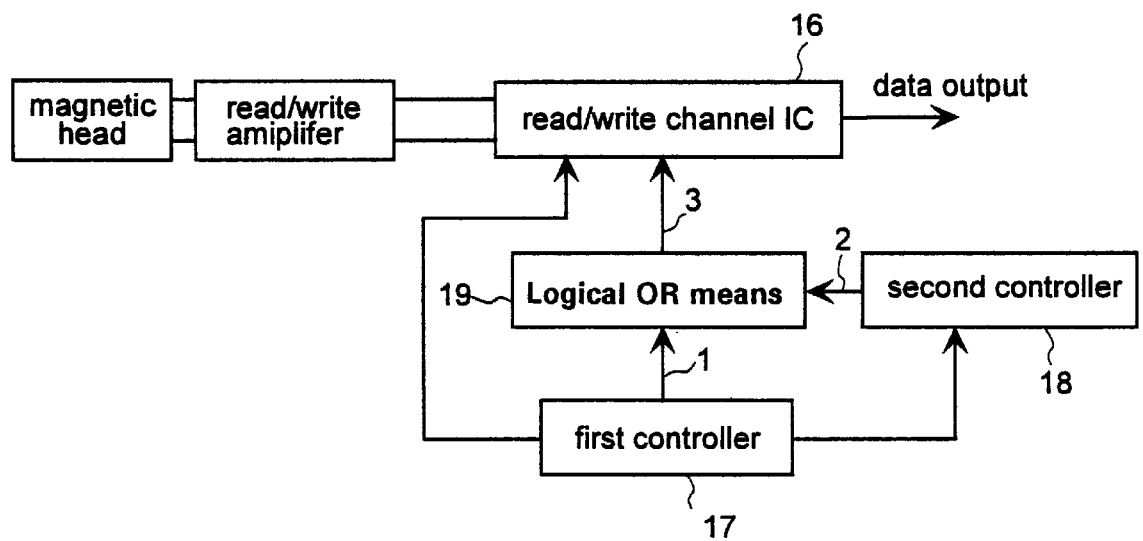
FIG. 6 is a block diagram showing an example of an electronic circuit embodying the present invention.

Next, a constitution of a read channel in the magnetic disk device which is an embodiment of the present invention, is explained referring to a block diagram shown in FIG. 6.

Figure 1:
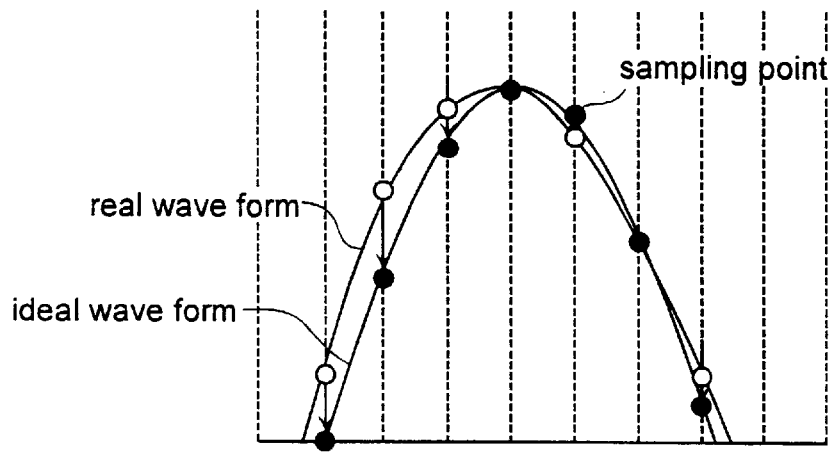
FIG. 1 is a figure for explaining that a signal wave form from a destination sector is adapted and comes to be similar to an ideal wave form by the adaptation of coefficients for equalization.
Figure 2:
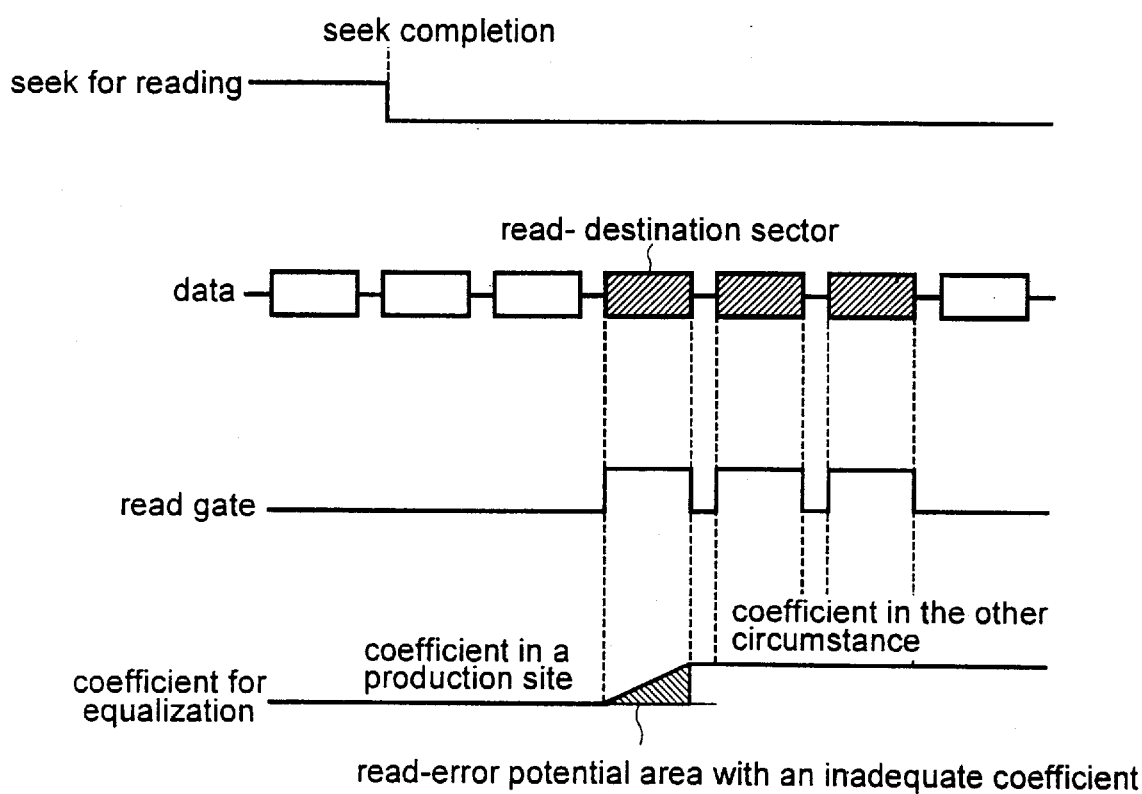
FIG. 2 is a time chart showing a gate timing in the conventional automatic adaptation of the coefficient for equalization.
Figure 3:
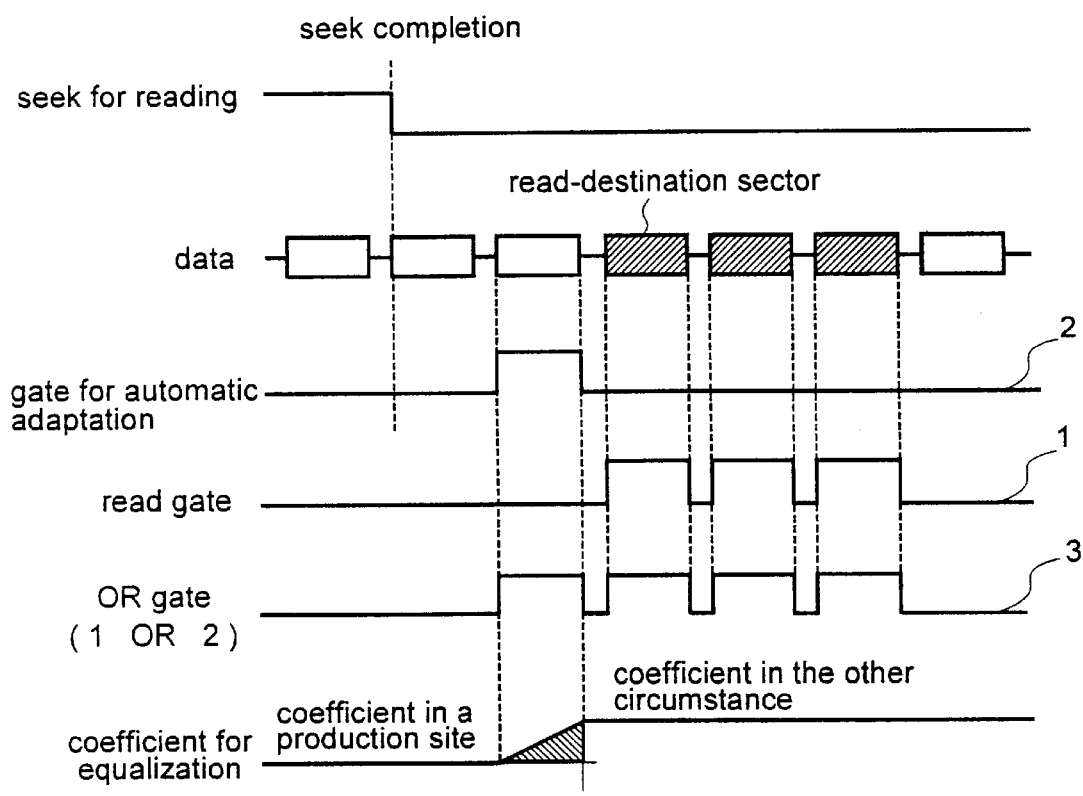
FIG. 3 is a time chart showing a gate timing in the automatic adaptation of the coefficient for equalization when the present invention is applied.

This read channel at least comprises the following: a magnetic head which writes data to a recording medium and reads data from the recording medium, a read/write amplifier which ouputs a read signal at a read-output terminal and outputs a write signal to the magnetic head, a read/write channel IC 16 which has an automatic adaptation function of coefficients for equalization, a first controller 17 which produces a read gate signal 1 (FIG. 3), a second controller 18 which is synchronized with said first controller and produces a gate signal 2 for automatic adaptation (FIG. 3), and a logical OR means 19 which produces an OR gate signal 3 being the logical OR of the read gate signal 1 and the gate signal 2 for automatic adaptation.

Next, the operation of the read channel constructed above is explained.

The first controller 17 generates a timing signal for writing and reading data by the magnetic head, and a clock signal which is a base timing signal for the operation of the read/write channel IC 16 and the second controller 18. Furthermore, the first controller 17 also controls the read gate signal 1 in FIG. 3 which is a timing to take in the read signal. The second controller 18 synchronizes to the first controller 17 utilizing the clock signal and controls the gate signal 2 for automatic adaptation in FIG. 3. A logical OR gate signal 3 is produced by executing a logical OR with the above two gate signals using the logical OR means 19, and the gate signal 3 is given to the read/write channel IC 16. The read gate signal 1 which is controlled by the first controller 17 is also given to the read/write channel IC 16.

The read signal which is reproduced by the magnetic head, is amplified by the read/write amplifier to such level as the read/write channel IC can recognize. The amplified signal is given to the read/write channel IC 16 and utilized for the automatic adaptation of the equalization coefficient with the above-mentioned logical OR gate timing. Simultaneously, this signal is translated to data in the read/write channel IC 16 in the timing of the read gate signal 1 and the data is output from the read/write channel IC 16 to the next read process. In this translation to data, the newly equalized coefficients are applied using the logical OR gate signal 3 which has been opened earlier than the read gate 1. The equalization coefficients are established in the first open of the logical OR gate 3.

The read gate signal 1 and the gate signal 2 for automatic adaptation may be produced by the same controller. The logical OR function by the logical OR means 19 may be installed in a program of the first controller 17 or the second controller 18. In this case, the independent logical OR means 19 as hardware is unnecessary. In addition, when an input terminal for the automatic adaptation gate to control automatic adaptation is provided in the read/write channel IC besides the usual read gate input terminal, the logical OR means 19 is unnecessary, and the read gate signal 1 may be put in the read gate input terminal and the gate signal 2 for automatic adaptation may be put in the input terminal for automatic adaptation gate.

Next, in the magnetic disk device as an embodiment of the present invention, conditions in which the automatic adaptation function becomes effective are explained.

The coefficients for equalization are required to be set to initial constants corresponding to the zone on the magnetic disk medium by one head switched to another, or by a seek operation for another zone by the actuator.

On the other hand, the equalization coefficients are almost the same in the same zone, with the same head, in and the same environment. Therefore, when the same head seeks a track in the same zone, it is possible to use the same equalization coefficients which have been adapted by that time. Accordingly, in this case, it is unnecessary to execute the automatic adaptation by making the automatic adaptation gate open before reading data from a destination sector.

When a magnetic head is switched to another head or when a track in another zone is sought by the actuator, if a latency time (a waiting time in rotation) until a start of reading data from the destination sector is too short to execute the automatic adaptation efficiently, it is unnecessary to execute the automatic adaptation of the coefficient for signal wave equalization by making the automatic adaptation gate open earlier before reading data from a destination sector.

Except for the above two cases in which the automatic adaptation function is not applied, the automatic adaptation function is activated by default.

In the automatic adaptation function of the coefficient for equalization, signals received while the automatic adaptation gate is opened, are treated as only wave forms, not as data which mean contents of the signals. Therefore, signal wave forms used in the automatic adaptation are considered to be sufficient if the signal wave forms are recorded in any area where the wave forms can be read from, and it is not restricted to the wave forms recorded in a user data area. Namely, either of the following forms will do: the signal wave forms which are recorded previously on the magnetic disk medium at shipment of the device, or the signal wave forms which are reproduced from data recorded by users after the shipment of the device. The latter signal wave forms are better for use in order to obtain high accuracy in signal wave equalization.

The timings to open the gate for the automatic adaptation of the equalization coefficients are as follows:
1) at a timing when a seek complete signal (the operation has finished normally) is detected; and
2) at a timing when the magnetic head comes over a sector which is everal sectors ahead from the destination sector to be read.

In both timings described above, the equalization coefficients are adapted actually while the logical OR gate which is the logical OR of the read gate signal 1 and the gate signal 2 for the automatic adaptation is opened; therefore, the timing when the gate 2 is closed is not limited to the timing when the read gate signal 1 is detected, but it is allowed to be an arbitrary timing after the operation time required for completion of the automatic adaptation has been ensured.

The start timing of the automatic adaptation operation in the read/write IC which has the automatic adaptation function has been provided before required data are read from a destination sector; thereby, various parameters have been able to be adapted by the automatic adaptation before the data are read from the destination sector. A magnetic disk device having high reliability against the variation of the environment can be provided.

Having described a preferred embodiment of the invention with reference to the accompanying drawings, it is to be understood that the invention is not limited to the embodiments and that various changes and modifications could be effected therein by one skilled in the art without departing from the spirit or scope of the invention as defined in the appended claims.

What is claimed is:

1. An automatic adaptation method in a magnetic disk device, comprising:
   a first step in which a signal showing that a seek is complete is output;
   a second step in which a signal to open a gate is issued;
   a third step in which a signal to set a parameter is issued, corresponding to the gate signal issued in the second step; and
   a fourth step in which a signal to open a gate to read data is issued after the third step.

2. A magnetic disk device having a function for an automatic parameter adaptation, comprising:
   a magnetic recording medium being rotatably supported;
   a spindle motor for rotating said magnetic reproducing data to and from said magnetic recording medium;
   an actuator for moving said magnetic head onto an appointed position on said magnetic recording medium; and
   a controller for adapting parameters automatically using a signal from said magnetic head, and communicating a signal from said magnetic head into another circuit; wherein
   said controller adapts said parameters automatically corresponding to a read data request, after said magnetic head has been positioned completely to an appointed position on said magnetic recording medium, and before said data is read.

3. The magnetic disk device according to claim 2, wherein said controller adapts said parameters after a seek-complete signal has been detected.

* * * * *